United States Patent
Nakagawa et al.

(10) Patent No.: US 10,940,585 B2
(45) Date of Patent: Mar. 9, 2021

(54) VIBRATION SUPPRESSION DEVICE

(71) Applicant: FANUC Corporation, Yamanashi (JP)

(72) Inventors: Hiroshi Nakagawa, Yamanashi (JP); Takafumi Kajiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 201 days.

(21) Appl. No.: 16/194,391

(22) Filed: Nov. 19, 2018

(65) Prior Publication Data

US 2019/0160664 A1 May 30, 2019

(30) Foreign Application Priority Data

Nov. 30, 2017 (JP) .............................. JP2017-229843

(51) Int. Cl.
*B25J 9/16* (2006.01)
*G05B 19/416* (2006.01)

(52) U.S. Cl.
CPC ............. *B25J 9/163* (2013.01); *B25J 9/1602* (2013.01); *B25J 9/1651* (2013.01); *B25J 9/1674* (2013.01); *B25J 9/1692* (2013.01); *B25J 9/1669* (2013.01); *G05B 19/416* (2013.01); *G05B 2219/39271* (2013.01)

(58) Field of Classification Search
CPC ........ B25J 9/163; B25J 9/1602; B25J 9/1651; B25J 9/1674; B25J 9/1692; G05B 19/423–427; G05B 19/416
See application file for complete search history.

(56) References Cited

U.S. PATENT DOCUMENTS

| | | | |
|---|---|---|---|
| 4,706,003 A | 11/1987 | Nakashima et al. | |
| 2006/0206284 A1 | 9/2006 | Hirabayashi | |
| 2011/0208356 A1 | 8/2011 | Kato et al. | |
| 2012/0296471 A1* | 11/2012 | Inaba ...................... | B25J 9/163 700/253 |
| 2013/0218335 A1 | 8/2013 | Barajas et al. | |
| 2015/0183114 A1 | 7/2015 | Takahashi et al. | |
| 2015/0251312 A1 | 9/2015 | Suzuki et al. | |
| 2016/0344326 A1 | 11/2016 | Fujiwara | |
| 2017/0031329 A1 | 2/2017 | Inagaki et al. | |
| 2017/0043439 A1 | 2/2017 | Naitou | |
| 2017/0043481 A1 | 2/2017 | Hannya | |

(Continued)

FOREIGN PATENT DOCUMENTS

| CN | 104589344 A | 5/2015 |
|---|---|---|
| CN | 105359406 A | 2/2016 |

(Continued)

*Primary Examiner* — Dale Moyer
(74) *Attorney, Agent, or Firm* — Hauptman Ham, LLP

(57) ABSTRACT

A vibration suppression device acquires a teaching position, computes a speed plan based on the acquired teaching position and a first acceleration/deceleration parameter, computes data related to deflection occurring during an acceleration/deceleration operation of a robot based on the teaching position and the speed plan, and acquires data indicating a posture at the teaching position. Further, a machine learning unit of the vibration suppression device estimates an acceleration/deceleration parameter with respect to the data related to the deflection and the data related to the posture using the data related to the deflection and the data related to the posture as input data.

6 Claims, 6 Drawing Sheets

(56) References Cited

U.S. PATENT DOCUMENTS

| | | | |
|---|---|---|---|
| 2017/0144301 A1 | | 5/2017 | Washizu et al. |
| 2017/0205802 A1* | | 7/2017 | Wang et al. |
| 2018/0222048 A1* | | 8/2018 | Hasegawa .............. B25J 9/1697 |
| 2018/0225113 A1* | | 8/2018 | Hasegawa ................ B25J 9/161 |
| 2018/0229364 A1* | | 8/2018 | Wang ...................... B25J 9/163 |

FOREIGN PATENT DOCUMENTS

| | | | |
|---|---|---|---|
| CN | 105773628 | A | 7/2016 |
| CN | 106094528 | A | 11/2016 |
| CN | 106444624 | A | 2/2017 |
| DE | 102013202378 | B4 | 7/2015 |
| DE | 102014019409 | A1 | 7/2015 |
| DE | 102016008987 | A1 | 2/2017 |
| DE | 102016009444 | A1 | 2/2017 |
| DE | 102016013731 | A1 | 5/2017 |
| DE | 102017000063 | A1 | 7/2017 |
| EP | 0187864 | A1 | 7/1986 |
| JP | H04324507 | A | 11/1992 |
| JP | H643944 | A | 2/1994 |
| JP | 2006252383 | A | 9/2006 |
| JP | 2011-167817 | A | 9/2011 |
| JP | 4850956 | B2 | 1/2012 |
| JP | 2015-168053 | A | 9/2015 |
| JP | 6006256 | B2 | 10/2016 |

\* cited by examiner

VIBRATION SUPPRESSION DEVICE

RELATED APPLICATIONS

The present application claims priority of Japanese Application Number 2017-229843, filed on Nov. 30, 2017, the disclosure of which is hereby incorporated by reference herein in its entirety.

BACKGROUND OF THE INVENTION

1. Field of the Invention

The present invention relates to a vibration suppression device and a machine learning device, and particularly relates to a vibration suppression device that learns an optimum acceleration/deceleration time for operation of an industrial robot.

2. Description of the Related Art

In a manufacturing process carried out at a factory, shortening of a manufacturing cycle time is required. As a method of shortening the manufacturing cycle time, it is conceivable to increase an operation speed of each manufacturing machine or increase acceleration. However, for example, when a command speed of a servomotor that drives each joint is increased or an acceleration/deceleration time is shortened to improve an operation speed of an industrial robot such as an articulated robot, vibration is likely to be generated in the industrial robot.

Vibration of the industrial robot is generated mainly during acceleration and deceleration rather than when the servomotor that drives each joint is operating at a constant speed. Therefore, in an operation plan for the robot, it is important to obtain an optimum acceleration/deceleration time that allows accelerate and decelerate in a shortest time within an allowable range of vibration with respect to an operation plan of the robot.

As a conventional technology for reducing vibration of an industrial robot, for example, Japanese Patent Application Laid-Open No. 2011-167817 discloses a technology of attaching a sensor for detecting a position to a robot and reducing vibration by learning a correction amount. In addition, Japanese Patent Application Laid-Open No. 2015-168053 discloses a method of speeding up an operation of a robot by learning from the torque of a motor and target error information without using a sensor.

In the technology disclosed in Japanese Patent Application Laid-Open No. 2011-167817, vibration may be highly accurately controlled based on sensor information. However, iterative learning in a state in which a workpiece is actually gripped by an industrial robot at a working site is necessary, and there is a problem that a burden is imposed on a user over time. In addition, a sensor is required to perform iterative learning, and the user needs to prepare the sensor at the working site. Thus, there is a problem that a burden is imposed on the user in terms of cost.

Meanwhile, in Japanese Patent Application Laid-Open No. 2015-168053, a burden on the user is reduced because a sensor is unnecessary and re-learning within a region is unnecessary. However, there is a problem similar to that of Japanese Patent Application Laid-Open No. 2011-167817 in that learning at a working site is necessary. Further, there arises another problem that accuracy of vibration suppression is limited since there is no sensor.

SUMMARY OF THE INVENTION

In this regard, an object of the present invention is to provide a vibration suppression device capable of learning an optimum acceleration/deceleration time for performing operation of an industrial robot at a stage before shipment of the industrial robot.

To solve the above-mentioned problem, the vibration suppression device of the invention has a function of calculating a position of each axis and a deflection amount of each axis during robot operation and estimating an acceleration/deceleration time using a machine learning device (neural network) based on the position and the deflection amount, thereby performing an optimum acceleration/deceleration operation. Learning of this machine learning device (neural network) can be performed using a sensor at a stage before manufacturer shipment, learning of each user at a working site is unnecessary, and the user does not have to prepare a sensor. Thus, it is possible to provide an optimal robot operation without imposing a burden on the user in terms of time and cost.

The present invention is characterized in that it is presumed that there is a correlation between the deflection amount of the axis and the amount of vibration as described above, and this correlation is used as an input of the machine learning device (neural network). In general, since each axis of a robot rotates or performs direct motion, a bearing is present in this portion, and this portion has lower rigidity than that of another arm portion. For this reason, deflection occurring on the axis becomes relatively large, and contribution to vibration of the robot increases. Therefore, the deflection amount of the axis may be suitable as an input to the machine learning device (neural network) that obtains an acceleration/deceleration time for suppressing vibration to a small degree.

A vibration suppression device according to an aspect of the present invention suppresses vibration generated during an acceleration/deceleration operation of a robot to be controlled such that the vibration corresponds to a predetermined threshold value or less, and includes a teaching position acquisition unit that acquires a teaching position, a speed plan unit that computes a speed plan based on the teaching position and a first acceleration/deceleration parameter, a deflection computation unit that computes data related to deflection occurring during the acceleration/deceleration operation of the robot based on the teaching position and the speed plan, a posture data acquisition unit that acquires data related to a posture at the teaching position based on the teaching position, and a machine learning unit that estimates a second acceleration/deceleration parameter with respect to the data related to the deflection and the data related to the posture using the data related to the deflection and the data related to the posture as input data.

The vibration suppression device may further include a convergence determination unit that determines whether or not the second acceleration/deceleration parameter converges to the first acceleration/deceleration parameter, wherein when it is determined that the second acceleration/deceleration parameter does not converge, the convergence determination unit may correct the first acceleration/deceleration parameter and command the speed plan unit to re-compute the speed plan using a correction result.

The vibration suppression device may further include an optimum acceleration/deceleration search unit that searches for a fastest optimum acceleration/deceleration parameter from among acceleration/deceleration parameters that allow vibration of the robot kept below a predetermined threshold value, wherein the machine learning unit may learn the second acceleration/deceleration parameter using the optimum acceleration/deceleration parameter obtained by the optimum acceleration/deceleration search unit as teacher data. In this case, the optimum acceleration/deceleration search unit may obtain an optimum acceleration/deceleration parameter using a simulator.

The machine learning unit may perform learning using a neural network.

The vibration suppression device may be connected to a plurality of robot controllers through a network, estimate the second acceleration/deceleration parameter, and transmit the estimated second acceleration/deceleration parameter to each of the robot controllers.

According to the present invention, an optimum acceleration/deceleration time of a robot may be realized without learning at a working site. In this way, an optimum robot operation may be realized without imposing a burden on a user in terms of time and cost. In addition, normally, a table, etc. needs to be used to compute an acceleration/deceleration time from a posture of a robot and a deflection amount of each axis. However, due to a lot of input variables, dimensions of the table are excessively large, and mounting is practically difficult. However, in the present invention, this problem can be avoided using a neural network here.

DETAILED DESCRIPTION OF THE PREFERRED EMBODIMENTS

Figure 1:
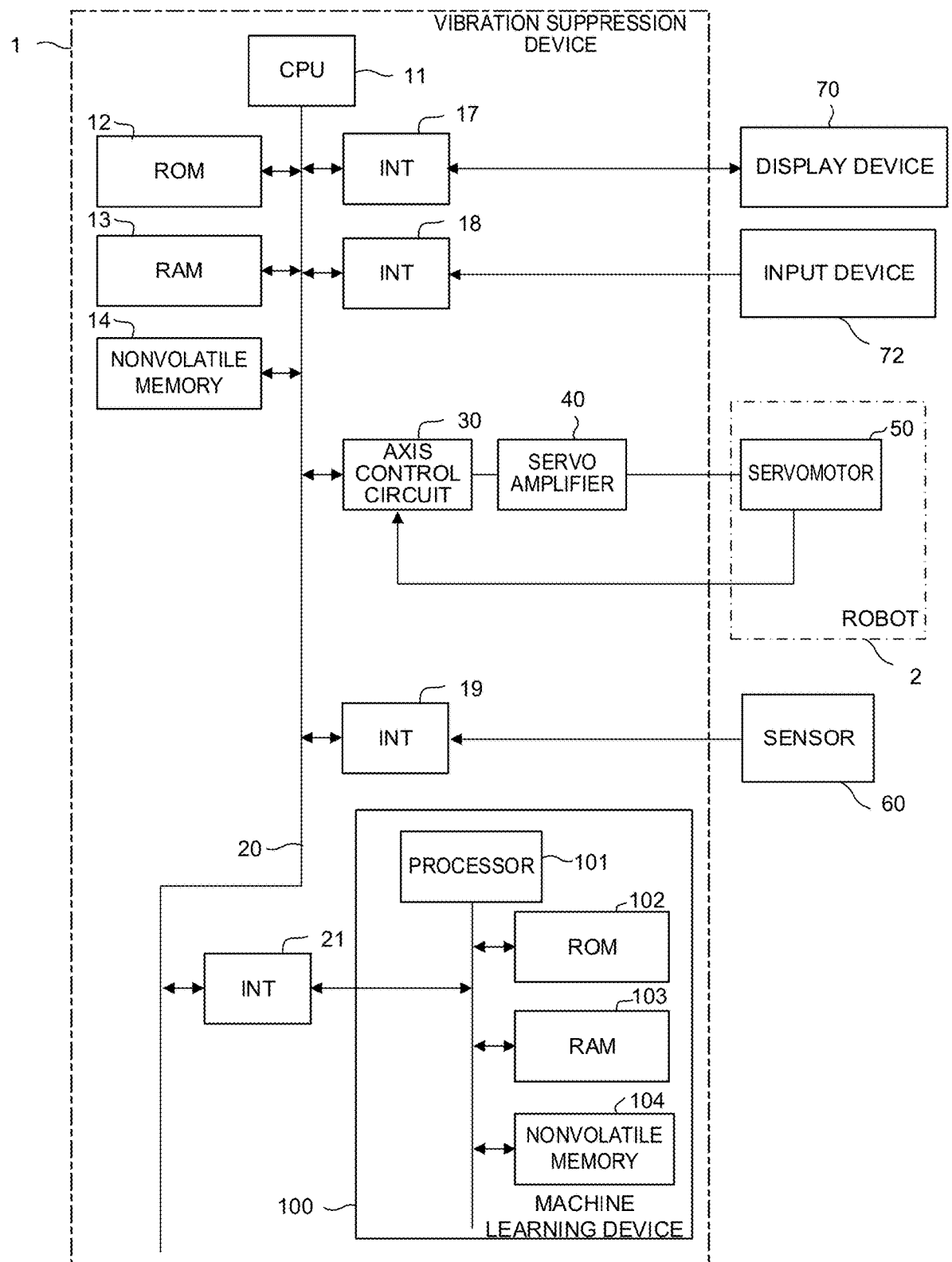
FIG. 1 is a schematic hardware configuration diagram of a vibration suppression device according to a first embodiment.

FIG. 1 is a schematic hardware configuration diagram illustrating a main part of a vibration suppression device according to a first embodiment.

For example, the vibration suppression device 1 may be mounted as a controller that controls a robot or mounted as a computer (for example, a cell computer, a host computer, a cloud server, etc.) connected to the controller that controls the robot. FIG. 1 illustrates an example of a case in which the vibration suppression device 1 is mounted as a controller that controls a robot 2.

A central processing unit (CPU) 11 included in the vibration suppression device 1 according to the present embodiment is a processor that controls the vibration suppression device 1 as a whole. The CPU 11 reads a system program stored in a read only memory (ROM) 12 via a bus 20, and controls the entire vibration suppression device 1 according to the system program. A random access memory (RAM) 13 temporarily stores temporary calculation data or display data, various data input by an operator via an input unit (not illustrated), etc.

For example, a nonvolatile memory 14 is configured as a memory that is kept in a storage state even when a power source of the vibration suppression device 1 is turned OFF by being backed up by a battery (not illustrated). The nonvolatile memory 14 stores a control program read from the outside via an interface (not illustrated), a control program input via an input device 72, various data (a parameter required for arithmetic operation, etc.) input from the input device 72, various data (for example, data related to a deflection amount of each joint of the robot 2 computed by the CPU 11, an axis position of each joint of the robot 2, etc.) acquired from the robot 2 or a sensor 60, etc. The program stored in the nonvolatile memory 14 may be loaded in the RAM 13 during use. In addition, various system programs (including a system program for controlling exchange with a machine learning device 100) necessary for an operation of the vibration suppression device 1 are written in advance to the ROM 12.

A display device 70 is a device for displaying text and graphics indicating a state of the vibration suppression device 1 or the robot 2 output via an interface 17, and a liquid crystal display, etc. can be used. In addition, the input device 72 may correspond to a keyboard or a mouse for receiving an input from the operator, a teaching pendant including a pulse generator, etc. An input from the input device 72 is delivered to the CPU 11 via an interface 18.

An axis control circuit 30 for controlling a joint (axis) of the robot 2 receives an operation command amount of the axis from the CPU 11, and outputs an axis command to a servo amplifier 40. In response to this command, the servo amplifier 40 drives a servomotor 50 that operates an axis included in the robot 2. The servomotor 50 of the axis incorporates a position/speed detector to feedback a position/speed feedback signal from the position/speed detector to the axis control circuit 30, thereby performing feedback control of position/speed. In the hardware configuration diagram of FIG. 1, only one axis control circuit 30, one servo amplifier 40, and one servomotor 50 are illustrated. However, in practice, each of the number of axis control circuits, the number of servo amplifiers, and the number of servomotors to be prepared corresponds to the number of axes included in the robot 2 to be controlled.

The sensor 60 is used to detect vibration generated in the robot 2, and it is possible to use a general acceleration sensor or a non-contact type three-dimensional (3D) measuring device. Alternatively, an imaging device, etc. may be adopted as the sensor 60, and a moving image captured by the imaging device may be analyzed to detect vibration. Since vibration generated in the robot 2 can be detected based on fluctuation of a current of the servomotor 50, etc., the sensor 60 may not be used. In addition, in the embodiments, detection of vibration of the robot 2 is a necessary configuration at the time of learning of the machine learning device 100. When the vibration suppression device 1 is used to suppress vibration of the robot 2 using the machine learning device 100 finishing learning, a configuration of detecting vibration of the robot 2 is not always necessary.

An interface 21 is an interface for connecting the vibration suppression device 1 and the machine learning device 100 to each other. The machine learning device 100 includes a processor 101 that controls the entire machine learning device 100, a ROM 102 that stores a system program, etc., a RAM 103 that performs temporary storage in each process related to machine learning, and a nonvolatile memory 104 used to store a learning model, etc. The machine learning device 100 can observe each piece of information obtainable by the vibration suppression device 1 via the interface 21 (for example, data related to a deflection amount of each joint of the robot 2 computed by the CPU 11, an axis position of each joint of the robot 2, etc.).

In addition, the vibration suppression device 1 adjusts a parameter related to acceleration and deceleration of each axis of the robot 2, etc. based on a value output from the machine learning device 100.

Figure 2:
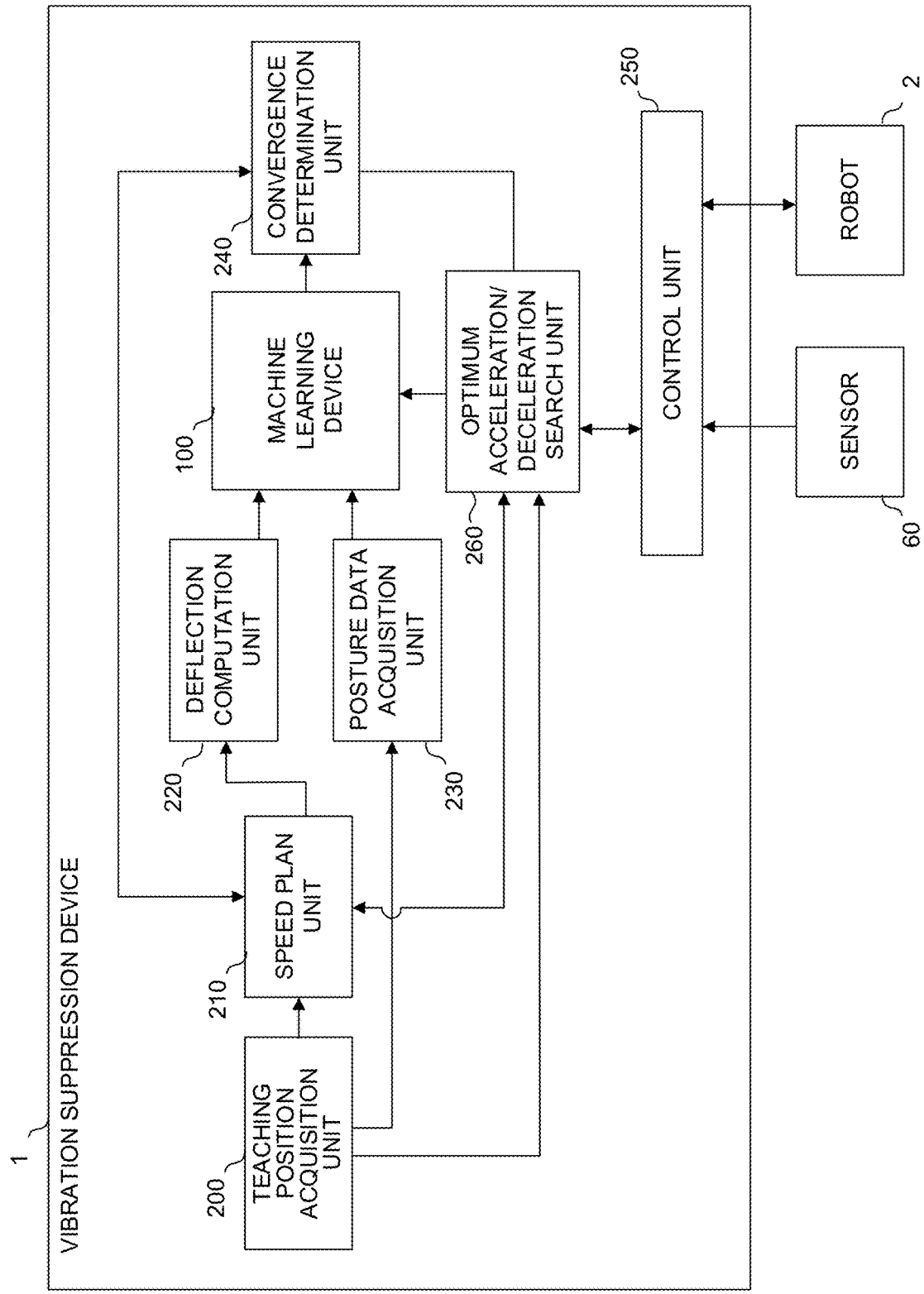
FIG. 2 is a schematic function block diagram of the vibration suppression device according to the first embodiment.

FIG. 2 is a schematic function block diagram of the vibration suppression device 1 according to the first embodiment.

Each function block illustrated in FIG. 2 is realized when the CPU 11 included in the vibration suppression device 1 illustrated in FIG. 1 and the processor 101 of the machine learning device 100 execute system programs, respectively, to control an operation of each unit of the vibration suppression device 1 and the machine learning device 100.

This vibration suppression device 1 includes a teaching position acquisition unit 200 that teaches a position of the robot 2, a speed plan unit 210 that forms a speed plan at the time of moving the robot 2 to the taught teaching position, a deflection computation unit 220 that computes data related to deflection of each axis of the robot based on the speed plan, a posture data acquisition unit 230 that acquires a position of each axis of the robot, a convergence determination unit 240 that performs convergence determination of an acceleration/deceleration parameter estimated by the machine learning device 100 based on the data related to the deflection or the axis position, a control unit 250 that controls the robot based on the estimated acceleration/deceleration parameter, and an optimum acceleration/deceleration search unit 260 that searches for an optimum acceleration/deceleration parameter based on the estimated acceleration/deceleration parameter.

The teaching position acquisition unit 200 acquires a teaching position of the robot 2 based on an input from the input device 72 by the operator (a teaching position of the robot 2 input from the teach pendant, etc. or a teaching position based on a learning plan input from the keyboard, etc.). The teaching position of the robot 2 acquired by the teaching position acquisition unit 200 includes position information of each axis included in the robot 2.

The speed plan unit 210 computes a speed plan of each axis at the time of operating to the teaching position of the robot 2 acquired by the teaching position acquisition unit 200. The speed plan unit 210 computes the speed plan based on an initial acceleration/deceleration parameter set in the nonvolatile memory 14, etc. in advance when the teaching position of the robot 2 acquired by the teaching position acquisition unit 200 is input. In addition, when re-computation of the speed plan is commanded from the convergence determination unit 240, the speed plan unit 210 computes the speed plan based on an acceleration/deceleration parameter corrected according to the command.

Figure 3:
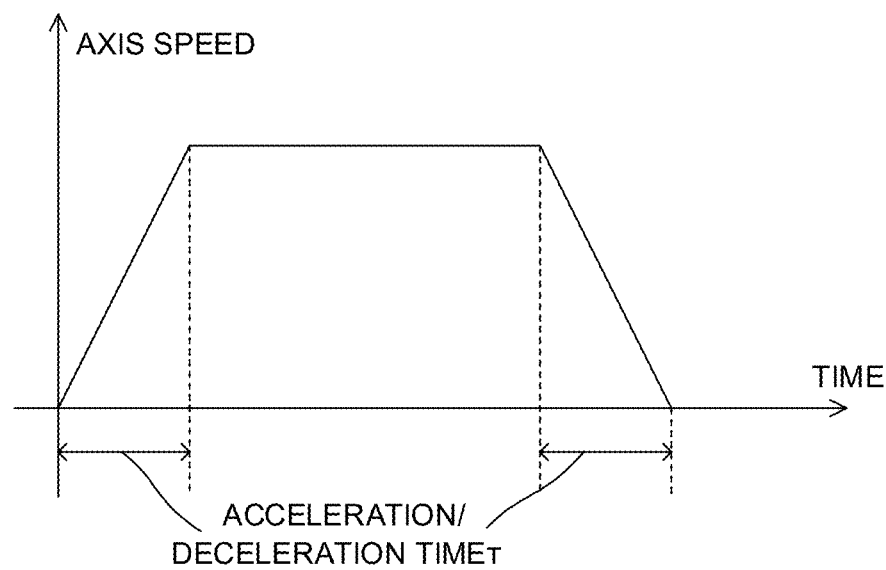
FIG. 3 is a diagram illustrating an example of a speed plan.

FIG. 3 is a diagram illustrating a speed plan computed by the speed plan unit 210.

In an example of FIG. 3, each axis of the robot 2 performs acceleration and deceleration of the axis by linear acceleration and deceleration. When the robot 2 performs acceleration and deceleration illustrated in FIG. 3, a speed plan may be computed by a teaching position of the robot 2, a maximum speed specification of each axis of the robot 2, and an acceleration/deceleration time $\tau$ (primary acceleration/deceleration time $\tau$) corresponding to an acceleration/deceleration parameter. Then, the speed plan may be changed by adjusting a value of the acceleration/deceleration time $\tau$. FIG. 3 is an example of the speed plan computed by the speed plan unit 210. For example, different acceleration/deceleration times may be used on an acceleration side and a deceleration side (in this case, the number of acceleration/deceleration parameters is two), or a speed plan using, for example, an acceleration/deceleration filter or a polynomial may be computed to more finely control an acceleration/deceleration waveform (in this case, the acceleration/deceleration parameter increases depending on the number of acceleration/deceleration filters or the degree of the polynomial).

The deflection computation unit 220 computes data related to deflection corresponding to data for specifying the amount of deflection occurring in each axis of the robot 2 based on the speed plan computed by the speed plan unit 210. For example, the deflection computation unit 220 computes a force or moment related to each axis of the robot 2 using a known method such as the Newton-Euler method based on a speed plan and a link weight, a position of a center of gravity, and inertia of the robot 2, and computes the deflection amount of each axis of the robot 2 as data related to deflection by multiplying the computed force or moment related to each axis of the robot 2 by a rigidity coefficient of each axis of the robot 2 obtained in advance through an experiment, etc. The data related to the deflection computed by the deflection computation unit 220 may not correspond to the deflection amount of each axis of the robot 2, and a data set that allows the deflection amount of each axis of the robot 2 to be indirectly obtained may be computed as the data related to the deflection.

The posture data acquisition unit 230 acquires data related to a posture corresponding to data for specifying a posture at a position (teaching position) at which the operation of the robot 2 is stopped. The data related to the posture corresponds to data that allows a position of each axis of the robot 2 to be directly or indirectly specified in a certain state (posture), which may be set as a set of values directly indicating a position of each axis in a certain state (a set of positions of the servomotor 50 that drives each joint) or set as a value or a set of values indirectly indicating a position of each axis in a certain state (for example, when the robot 2 is a six-axis robot, a position of each axis is uniquely determined by a position (coordinate value) of a distal end of the robot 2, and thus a value of the position of the distal end of the robot 2 may be used as the data related to the posture). Data related to a stop position of each axis of the robot 2 acquired by the posture data acquisition unit 230 is used as an input of a learning/estimation operation by the machine learning device 100 since a rigidity change due to the posture of the robot 2 affects vibration when the robot 2 stops.

The machine learning device 100 uses the data related to the deflection computed by the deflection computation unit 220 and the data related to the posture at the stop position of the robot 2 acquired by the posture data acquisition unit 230 as an input to learn/estimate an acceleration/deceleration parameter that allows the robot 2 to operate at a highest speed within a range in which vibration of the robot 2 can be suppressed in a case in which such an operation is performed. The machine learning device 100 learns an acceleration/deceleration parameter that allows the robot 2 to operate at the highest speed within the range in which vibration of the robot 2 can be suppressed with respect to the data related to the deflection and the data related to the posture at the stop position of the robot 2 by performing supervised learning according to a known machine learning algorithm, and estimates an acceleration/deceleration parameter that allows the robot 2 to operate at the highest speed within the range in which vibration of the robot 2 can be suppressed based on the data related to the deflection and the data related to the posture at the stop position of the robot 2 using a learned model as a learning result.

Figure 4:
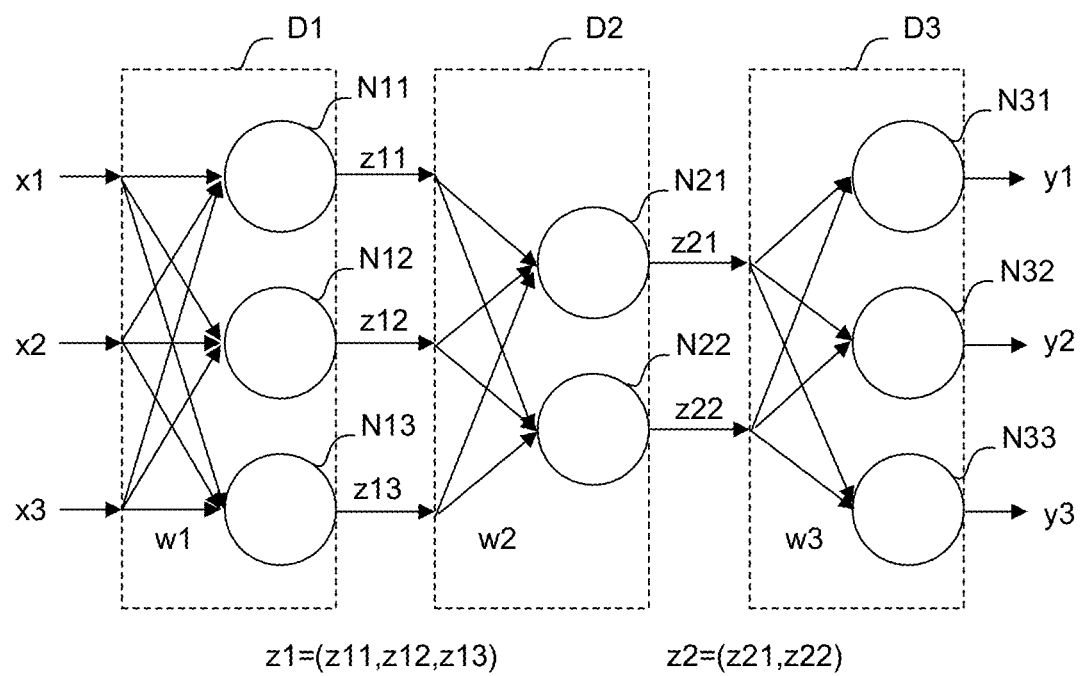
FIG. 4 is a diagram for description of a neural network.

Supervised learning is a scheme in which a known data set (referred to as teacher data) of an input and an output corresponding thereto is given, and a feature implying a correlation between the input and the output is distinguished from the teacher data, thereby learning a correlation model for estimating a required output with respect to a new input. When supervised learning is performed, for example, a neural network illustrated in FIG. 4 may be used as a learning/estimation unit of the machine learning device 100. FIG. 4 schematically illustrates a model of a three-layer neural network formed by combining neurons. In the neural network, the number of pieces of input data and the number of pieces of output data can be respectively adjusted by the number of neurons disposed in an input part and an output part. For example, such a neural network can be constituted by an arithmetic unit, a storage unit, etc. imitating a model of a neuron.

In a case in which a neural network is used in the machine learning device 100, a neural network in which the data related to the deflection and the data related to the posture at the stop position of the robot 2 are set as input data x (inputs $x_1, x_2, \ldots, x_m$) and the acceleration/deceleration parameter is set as result data y (results $y_1, y_2, \ldots, y_n$) is constructed in advance, and a learned model is constructed by adjusting a weight w ($w_1, w_2, w_3$) between neurons in a learning stage of the machine learning device 100 described below.

Even though the model of the three-layer neural network is illustrated in FIG. 4, it is possible to use a so-called deep learning method using a neural network having three or more layers as the learning/estimation unit of the machine learning device 100 of the present invention.

The convergence determination unit 240 determines whether or not the acceleration/deceleration parameter estimated by the machine learning device 100 based on the data related to the deflection and the data related to the posture at the stop position of the robot 2 has converged. The convergence determination unit 240 compares the acceleration/deceleration parameter (set as a first acceleration/deceleration parameter) used by the speed plan unit 210 for computing the speed plan with the acceleration/deceleration parameter (set as a second acceleration/deceleration parameter) estimated by the machine learning device 100 based on the data related to the deflection and the data related to the posture at the stop position of the robot 2 computed based on the acceleration/deceleration parameter, and determines that the acceleration/deceleration parameter estimated by the machine learning device 100 has converged when a difference between the first acceleration/deceleration parameter and the second acceleration/deceleration parameter is within a predetermined threshold value set in advance.

If the machine learning device 100 determines that the acceleration/deceleration parameter estimated by the machine learning device 100 has not converged yet, the convergence determination unit 240 corrects the acceleration/deceleration parameter, and then commands the speed plan unit 210 to compute the speed plan again. Assuming that the second acceleration/deceleration parameter estimated by the machine learning device 100 corresponds to the modified version of the first acceleration/deceleration parameter, the convergence determination unit 240 may command the speed plan unit 210 to compute the speed plan again using the modified first acceleration/deceleration parameter (that is, the second acceleration/deceleration parameter). In addition, the convergence determination unit 240 may correct the first acceleration/deceleration parameter using a correction formula of an acceleration/deceleration parameter empirically obtained in advance based on an amount of the difference between the first acceleration/deceleration parameter and the second acceleration/deceleration parameter and a sign thereof (the relationship of magnitudes between the first acceleration/deceleration parameter and the second acceleration/deceleration parameter), and command the speed plan unit 210 to compute the speed plan again using the corrected result.

When the machine learning device 100 having a high estimation ability capable of computing an optimum acceleration/deceleration parameter by one-time estimation based on an appropriate input is constructed, the configuration of the convergence determination unit 240 may be omitted. In this case, iterative calculation is not performed, and an optimum acceleration/deceleration parameter may be efficiently obtained.

The optimum acceleration/deceleration search unit 260 searches for an acceleration/deceleration parameter for operating the robot 2 at the highest speed within the range in which vibration of the robot 2 can be suppressed when each axis of the robot 2 is operated to the teaching position. For example, the optimum acceleration/deceleration search unit 260 may search for an optimum acceleration/deceleration parameter by actually controlling the robot 2. In this case, at an initial stage of search, the optimum acceleration/deceleration search unit 260 causes the speed plan unit 210 to perform computation based on the acceleration/deceleration parameter determined to have converged by the convergence determination unit 240 (as an estimation result of the machine learning device 100), commands the control unit 250 to operate each axis of the robot 2 to the teaching position based on the computed speed plan, and acquires vibration generated when each axis of the robot 2 is operated to the teaching position from the sensor 60.

When vibration of the robot 2 is larger than a predetermined threshold value set in advance, the optimum acceleration/deceleration search unit 260 adjusts the acceleration/deceleration parameter such that acceleration/deceleration becomes gentler, causes the speed plan unit 210 to compute the speed plan again based on the adjusted acceleration/deceleration parameter, and performs operation of the robot 2 measurement of vibration again based on the computed speed plan.

On the other hand, when vibration of the robot 2 is smaller than the predetermined threshold value set in advance, and there is a margin (when there is a difference more than a threshold by a predetermined margin amount), the optimum acceleration/deceleration search unit 260 adjusts the acceleration/deceleration parameter such that acceleration/deceleration becomes steeper, causes the speed plan unit 210 to re-compute the speed plan based on the adjusted acceleration/deceleration parameter, and performs operation of the robot 2 and measurement of vibration again based on the computed speed plan.

By repeating the above process, the optimum acceleration/deceleration search unit 260 obtains the optimum acceleration/deceleration parameter that allows the robot 2 to operate at the highest speed within the range in which vibration of the robot 2 can be suppressed.

The optimum acceleration/deceleration search unit 260 may search for the optimum acceleration/deceleration parameter without actually controlling the robot 2. For example, a scheme of obtaining the optimum acceleration/deceleration parameter using a high-precision simulator, etc. is effective.

In this way, learning of the machine learning device 100 is advanced using the optimum acceleration/deceleration parameter obtained by the optimum acceleration/deceleration search unit 260, the data related to the deflection used as input data of the machine learning device 100 at the time of estimating the acceleration/deceleration parameter determined to have converged by the convergence determination unit 240, and the data related to the posture at the stop position of the robot 2.

Then, by performing the above procedure using various teaching positions, operation speeds, and load conditions, learning of the machine learning device 100 is advanced and a learned model is constructed.

The machine learning device 100 (learned model) obtained in this way may be used without change at a working site of a user, and thus learning again at the working site of the user is unnecessary. For this reason, it is unnecessary to prepare a sensor for vibration measurement on the user side, and it is possible to use only an outcome of learning without imposing a burden on the user.

Figure 5:
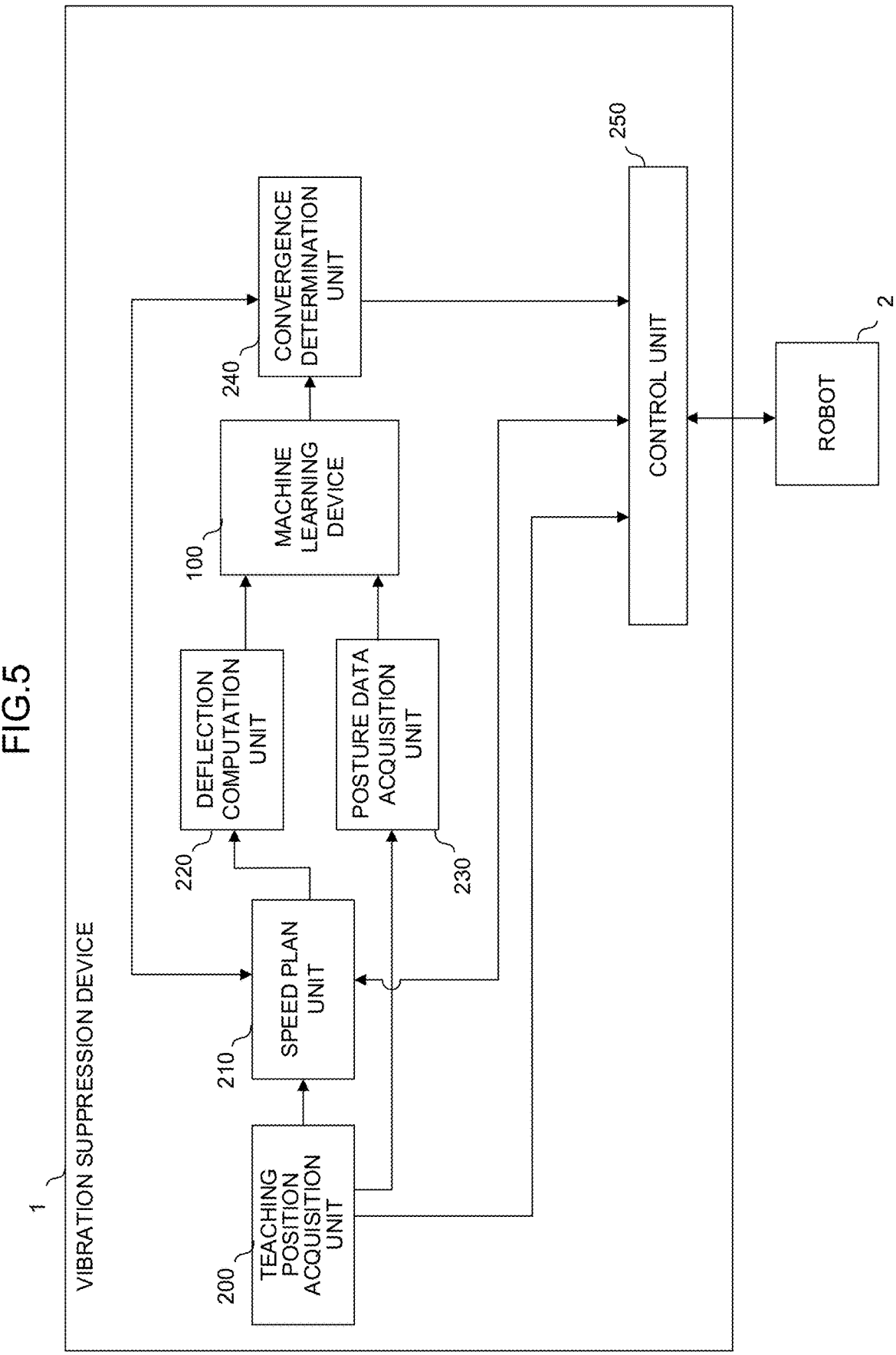
FIG. 5 is a schematic function block diagram of a vibration suppression device according to a second embodiment.

FIG. 5 is a schematic function block diagram of a vibration suppression device 1 of a second embodiment used at the working site of the user. Each function block illustrated in FIG. 5 is realized when the CPU 11 included in the vibration suppression device 1 illustrated in FIG. 1 and the processor 101 of the machine learning device 100 execute system programs, respectively, to control an operation of each unit of the vibration suppression device 1 and the machine learning device 100.

The machine learning device 100 included in the vibration suppression device 1 of the present embodiment is obtained by finishing construction of the learned model by the vibration suppression device 1 of the first embodiment, and other functional means operate similarly to the first embodiment.

Further, when the user uses the vibration suppression device 1 of the present embodiment, it is not necessary for the user to be conscious of processing executed by each functional means of the vibration suppression device 1. Processing is automatically performed only by teaching a position, and the robot 2 is controlled at an optimum acceleration/deceleration time constant.

Figure 6:
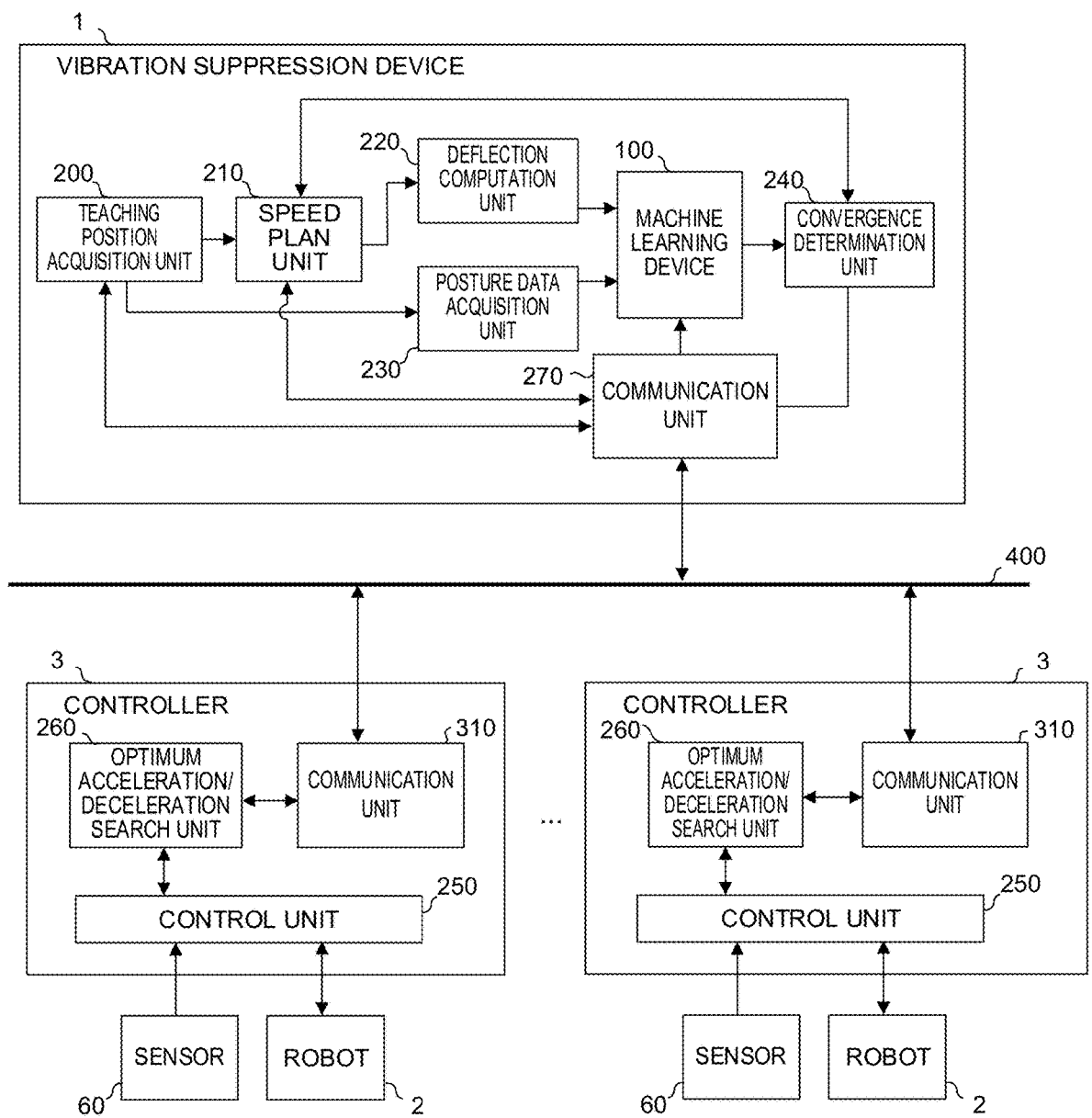
FIG. 6 is a schematic function block diagram of a vibration suppression device according to a third embodiment.

FIG. 6 is a schematic function block diagram of a vibration suppression device 1 according to a third embodiment in which a machine learning device 100 is disposed on a server such as a cell controller, a host computer, a cloud server, etc., connected to a controller 3 that controls a robot via a network 400.

In the present embodiment, each functional means has the same function as that of the first embodiment (FIG. 2) except that an optimum acceleration/deceleration search unit 260 is disposed on the controller 3 that controls the robot, the vibration suppression device 1 and a plurality of controllers 3 exchange an acceleration/deceleration parameter, a teaching position, a speed plan, etc. through communication units 270 and 310, and a teaching position acquisition unit 200 can acquire a teaching position of each robot from each of the controllers 3 as necessary. It is desirable that each robot 2 is an identical robot having the same function and performance.

The vibration suppression device 1 of the present embodiment obtains an acceleration/deceleration parameter related to each robot 2 based on the teaching position acquired from each controller 3 and transmits the obtained acceleration/deceleration parameter to each controller 3. In addition, each controller 3 actually operates the robot 2 based on the acceleration/deceleration parameter received from the vibration suppression device 1, searches for an optimum acceleration/deceleration parameter, and transmits the searched optimum acceleration/deceleration parameter to the vibration suppression device 1. Then, the vibration suppression device 1 performs learning of the machine learning device 100 based on the optimum acceleration/deceleration parameter received from each controller 3. Therefore, the vibration suppression device 1 of the present embodiment can perform learning in parallel with input of more data sets using the plurality of controllers 3 and improve the speed and reliability of machine learning.

Figure 7:
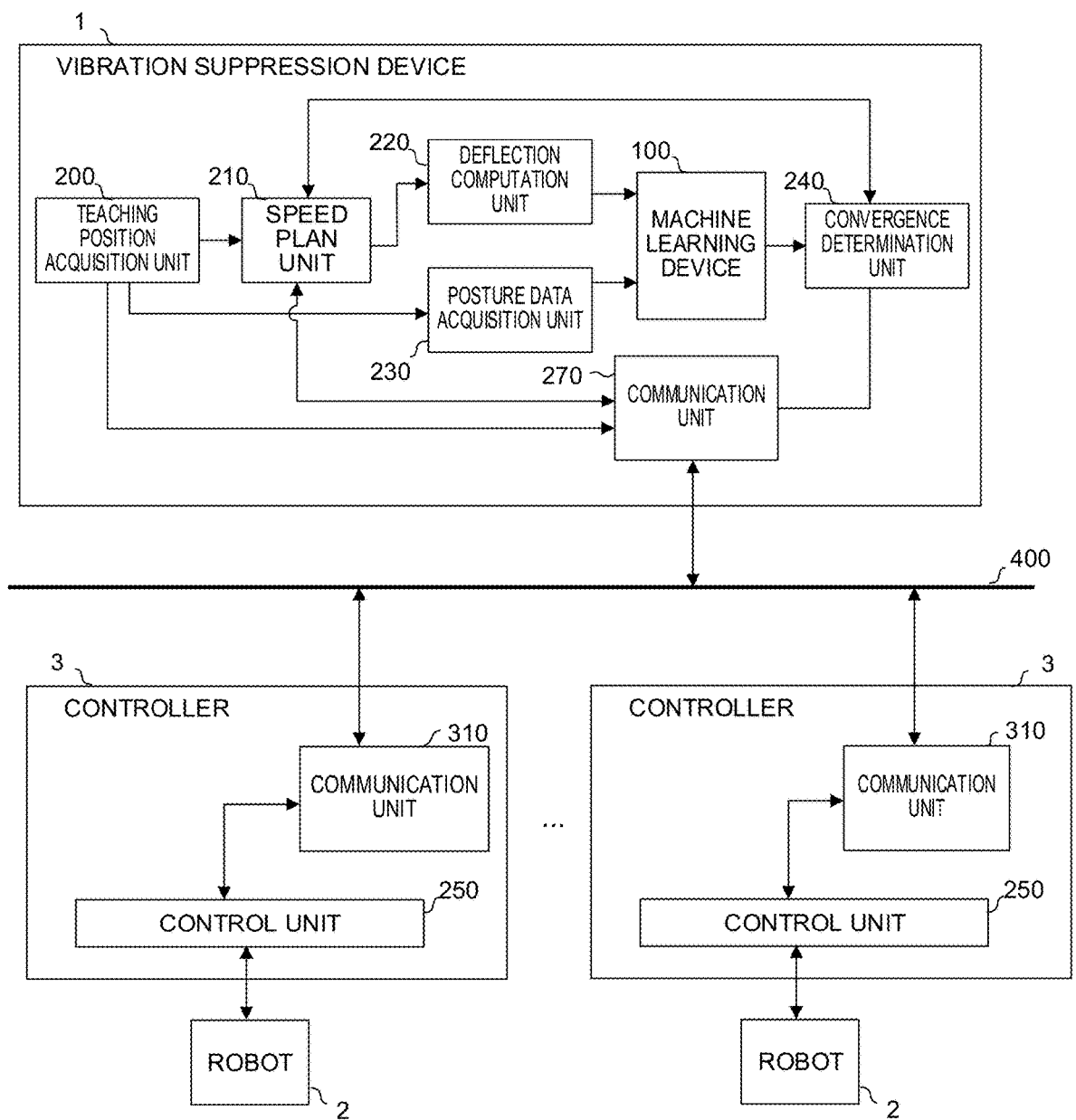
FIG. 7 is a schematic function block diagram of a vibration suppression device according to a fourth embodiment.

FIG. 7 is a schematic function block diagram of a vibration suppression device 1 according to a fourth embodiment in which a machine learning device 100 is disposed on a computer (for example, a server installed on a manufacturer side), etc. connected to a controller 3 that controls a robot used at the working site of the user via a network 400.

In the present embodiment, each functional means has the same function as that of the second embodiment (FIG. 5) except that the vibration suppression device 1 and a plurality of controllers 3 installed at the working site of the user exchange an acceleration/deceleration parameter, a teaching position, a speed plan, etc. through communication units 270 and 310, and a teaching position acquisition unit 200 can acquire a teaching position of each robot from each of the controllers 3. It is desirable that each robot 2 is an identical robot having the same function and performance.

Further, when the user uses the vibration suppression device 1 of the present embodiment, it is not necessary for the user to be conscious of processing executed by each functional means of the vibration suppression device 1. Processing is automatically performed only by teaching a position, and the robot 2 is controlled at an optimum acceleration/deceleration time constant. In this configuration, it is unnecessary to dispose the vibration suppression device 1 on the user side, and thus cost for the user and maintenance cost of the vibration suppression device 1 can be reduced.

In addition, even in a case in which the server is installed in a factory of the user not on the manufacturer side, since only one server is required for a plurality of robot controllers, cost for the user can be suppressed when compared to a case in which a function is implemented in each controller.

Even though the present invention has been described above, the present invention is not limited to those embodiments described above, and can be implemented in various modes by making appropriate changes.

For example, when rigidity of a hand or a tool that is attached to the robot 2 and used by the user is lower than expected, there is a possibility that vibration may increase in a part of the hand or the tool. Such a problem is dealt with by providing the vibration suppression device 1 with a function that allows the user to adjust the acceleration/deceleration time as needed since an extent of allowable vibration varies according to an application. For example, after obtaining an acceleration/deceleration parameter for increasing a speed while suppressing vibration of the robot without considering tool vibration by the vibration suppression device 1, the acceleration/deceleration parameter or the speed plan may be displayed on the display device 70, and the user may adjust the acceleration/deceleration parameter or the speed plan using the input device 72.

In addition, the data related to the deflection may be computed in consideration of a speed direction immediately before the robot 2 stops. For example, even though deflection constantly occurs by gravity, when the robot moves in a horizontal direction, the deflection does not change, and an influence on vibration is small. To take account of such an effect, only deflection of a component in the speed direction of the robot may be computed as the data related to the deflection.

Hereinafter, a description will be given of a difference between a vibration suppression method using machine learning of the present invention and another vibration suppression method not using machine learning.

There may be an approach in which the machine learning device 100 of FIG. 2 and FIG. 5 is used to compute a time constant at which vibration does not occur by calculating vibration using a simulator of a physical model. This method is used to perform an arithmetic operation on an operation of each part of the robot by simulation processing and simulate vibration. However, such a method has a large calculation amount, and processing in real time is difficult. In addition, even when vibration can be simulated, a scheme of changing an acceleration/deceleration parameter to reduce vibration to within a threshold value is unclear, and repeated calculation is necessary, which results in a further increase in the amount of calculation. On the other hand, in the vibration suppression method using machine learning of the embodiments, it is possible to greatly suppress the amount of calculation related to estimation of an acceleration/deceleration parameter by performing learning in advance using the machine learning device 100.

In addition, there may be an approach in which a table indicating a relationship between an input and an output is created, and the machine learning device 100 of FIG. 2 and FIG. 5 is used to compute an acceleration/deceleration parameter using the table. However, in this method, it is necessary to create a table of dimensions corresponding to the number of input variables, and data becomes enormous. Thus, realization is difficult in terms of man-hours of table creation experiments and in terms of a memory amount at the time of mounting. On the other hand, in the vibration suppression method using machine learning of the embodiments, it is possible to suppress both the experimental man-hours and the memory amount by performing learning in advance using the machine learning device 100.

The invention claimed is:

1. A vibration suppression device for suppressing vibration generated during an acceleration/deceleration operation of a robot to be controlled such that the vibration corresponds to a predetermined threshold value or less, the vibration suppression device comprising:
a processor configured to
acquire a teaching position,
compute a speed plan based on the teaching position and a first acceleration/deceleration parameter,
compute data related to deflection occurring due to the acceleration/deceleration operation of the robot based on the teaching position and the speed plan,
acquire data related to a posture at the teaching position based on the teaching position, and
estimate a second acceleration/deceleration parameter with respect to the data related to the deflection and the data related to the posture, using the data related to the deflection and the data related to the posture as input data.

2. The vibration suppression device according to claim 1, wherein
the processor is configured to
determine whether or not the second acceleration/deceleration parameter converges to the first acceleration/deceleration parameter, and
in response to determining that the second acceleration/deceleration parameter has not converged, correct the first acceleration/deceleration parameter and compute again the speed plan using a correction result.

3. The vibration suppression device according to claim 1, wherein
the processor is configured to
search for an optimum acceleration/deceleration parameter that allows the robot to operate at a highest speed from among acceleration/deceleration parameters while keeping vibration of the robot below the predetermined threshold value, and
learn the second acceleration/deceleration parameter, using the obtained optimum acceleration/deceleration parameter as teacher data.

4. The vibration suppression device according to claim 3, wherein
the processor is configured to obtain the optimum acceleration/deceleration parameter using a simulator.

5. The vibration suppression device according to claim 3, wherein
the processor is configured to perform learning using a neural network.

6. The vibration suppression device according to claim 1, wherein
the vibration suppression device is connected to a plurality of robot controllers through a network, and
the processor is configured to
estimate the second acceleration/deceleration parameter, and
transmit the estimated second acceleration/deceleration parameter to each of the plurality of robot controllers.

* * * * *